Figure 1:
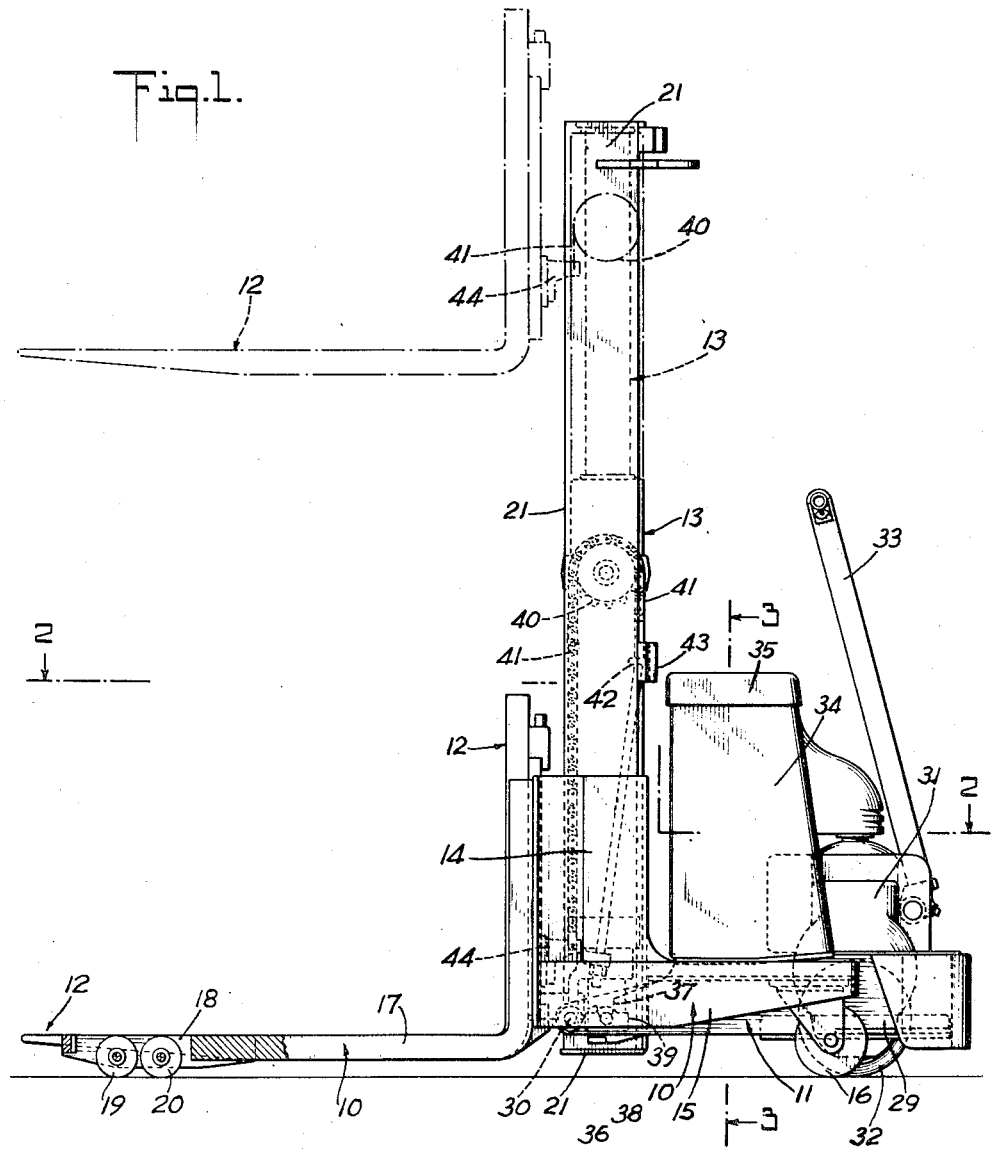

INVENTOR.
George F. Quayle

June 30, 1953      G. F. QUAYLE      2,643,740
LIFT TRUCK
Filed Nov. 26, 1949      3 Sheets-Sheet 3
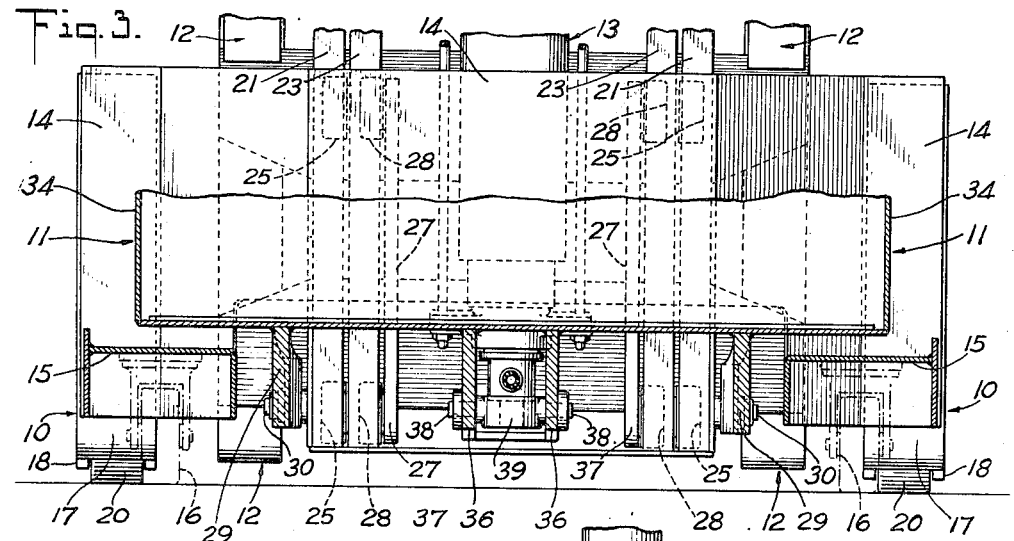
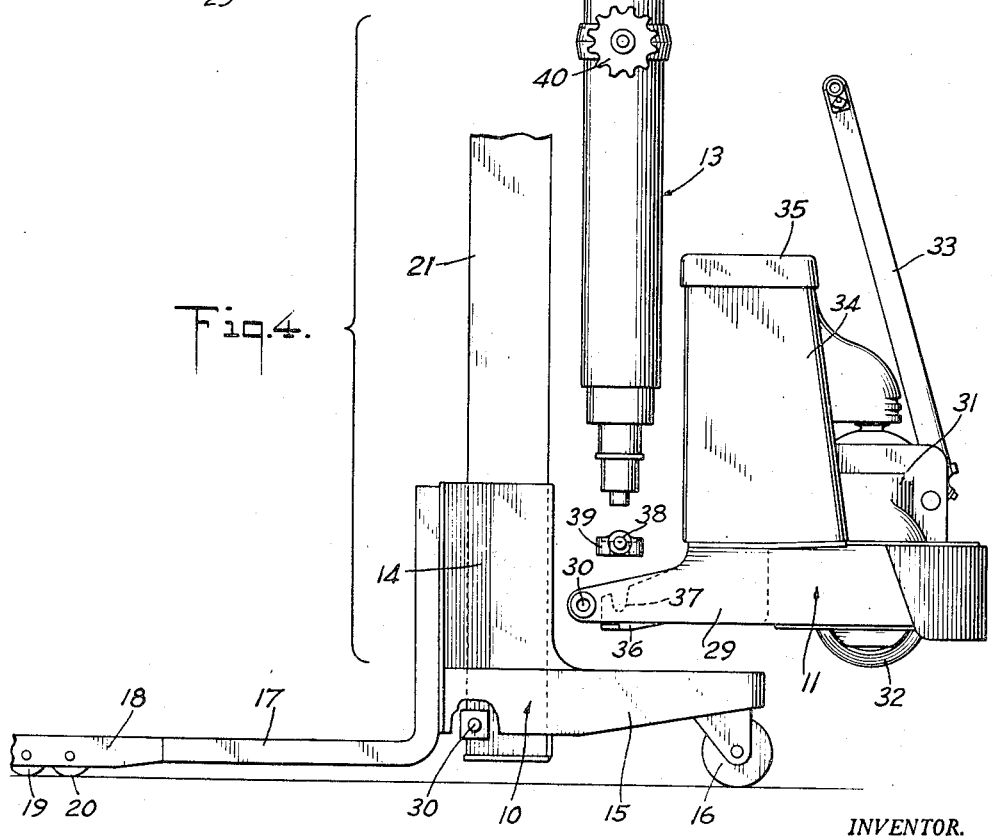
INVENTOR.
BY George F. Quayle
ATTORNEY Patented June 30, 1953

2,643,740

UNITED STATES PATENT OFFICE 2,643,740

LIFT TRUCK

George F. Quayle, Philadelphia, Pa., assignor to The Yale & Towne Manufacturing Company, Stamford, Conn., a corporation of Connecticut Application November 26, 1949, Serial No. 129,567

15 Claims. (Cl. 187—9)

This invention relates to industrial trucks of the type in which an elevating platform or lifting fork assembly is adapted to be raised by lifting mechanism, and preferably lifting mechanism of the hydraulic type.

The invention relates even more particularly to trucks of this class adapted to be propelled by one or more traction or drive wheels mounted at the forward end of the truck.

Usually a truck of this class is of tricycle construction supported for movement on three wheels and is relatively unstable. One point or station of support is represented by one or a plurality of closely associated and swively mounted traction or drive wheels at the forward end of the truck, and the other two stations are represented by idler wheels at the rear of the truck and separated as far apart as the width of the truck permits.

For a description of an industrial truck of this usual construction, reference may be had to the United States patents to Framhein, Nos. 2,469,638 and 2,417,395.

It will be apparent that in trucks of this class the usual three-station wheel support is not ideal for work requiring relatively high lifts, inasmuch as a considerable elevation of the center of gravity of the truck is hazardous during movement of a triangularly supported truck over an irregular surface. The danger of tilting and overturning of the truck moving over an irregular surface is plainly best met by providing the truck with four or more widely separated supporting wheels. A substantially rectangular arrangement of wheels is specially desirable. In order to stabilize trucks of this class many expedients have been devised, including stabilizing wheels at the sides of the lifting mechanism, as set forth in my United States patent application, Ser. No. 752,333, filed June 4, 1947.

The art further shows that trucks of this class may be built with a main frame on which is mounted for vertical movement relatively thereto an elevating platform or lifting fork assembly, the platform or fork being lifted by a hydraulic ram resting at its lower end upon the main frame, the ram being connected either directly or by means of chains with the platform or fork. The main frame is supported at its rear end by widely separated load wheels, and at each side of its front end by casters. Coupled to the front of the truck is a traction unit comprising a frame capable of pivotal movement with respect to the main frame in a vertical plane, and having a traction or drive wheel or wheels and a suitable source of power, such as a battery-energized motor or a gas engine.

Such trucks are stable, but it will be obvious that the weight carried by the elevating platform or lifting fork assembly is supported entirely by the main frame, and that the tractive effort of the traction unit does not vary in proportion to such weight, as is obviously desirable for driving and braking purposes. Where the load carried is considerable, it will be plain that the traction unit can supply no more tractive effort than is available when the truck is unloaded. Consequently, the traction wheel slips both in driving and in braking.

It is the general purpose of my invention to contribute an industrial truck having great stability for high lifts carried over irregular surfaces and a traction unit which automatically provides the tractive effort required for loads of various weights. I achieve these advantages by providing the main frame of my truck with four or more widely separated supporting wheels, mounting the elevating platform or lifting fork assembly on the main frame for vertical movement relatively thereto, coupling the traction unit to the main frame for vertical articulation of these two vehicular elements, and by mounting the lifting mechanism of the platform or fork on the traction unit itself.

In the truck of my invention, through a novel arrangement of the structure, the reaction of the lifting mechanism in holding the elevating platform in a raised position is accepted by the traction unit, and the tractive effort accordingly varies with the weight of the load.

The traction unit is preferably coupled pivotally to the main frame of the truck, but, of course, a sliding linkage may be employed. It is convenient for movement of the truck over an irregular surface that its vehicular elements are coupled for vertical articulation, but the couple is of particular importance in that that portion of the load applied to the traction unit operates to force the traction or drive wheel or wheels against the traction surface proportionately with the load and independently of the main frame. Consequently, the tractive effort of the traction unit increases directly with the load carried by the truck so that operation of the truck tends to be equally facile, for driving and braking purposes, under all load conditions.

I have thus outlined rather broadly the more important features of my invention so that the detailed description thereof, which follows, may be better understood and that my contribution to the art may be better appreciated. There are, of course, additional features of my invention to be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims to be granted me shall be of sufficient breadth to prevent the appropriation of my invention by those skilled in the art.

Figure 2:
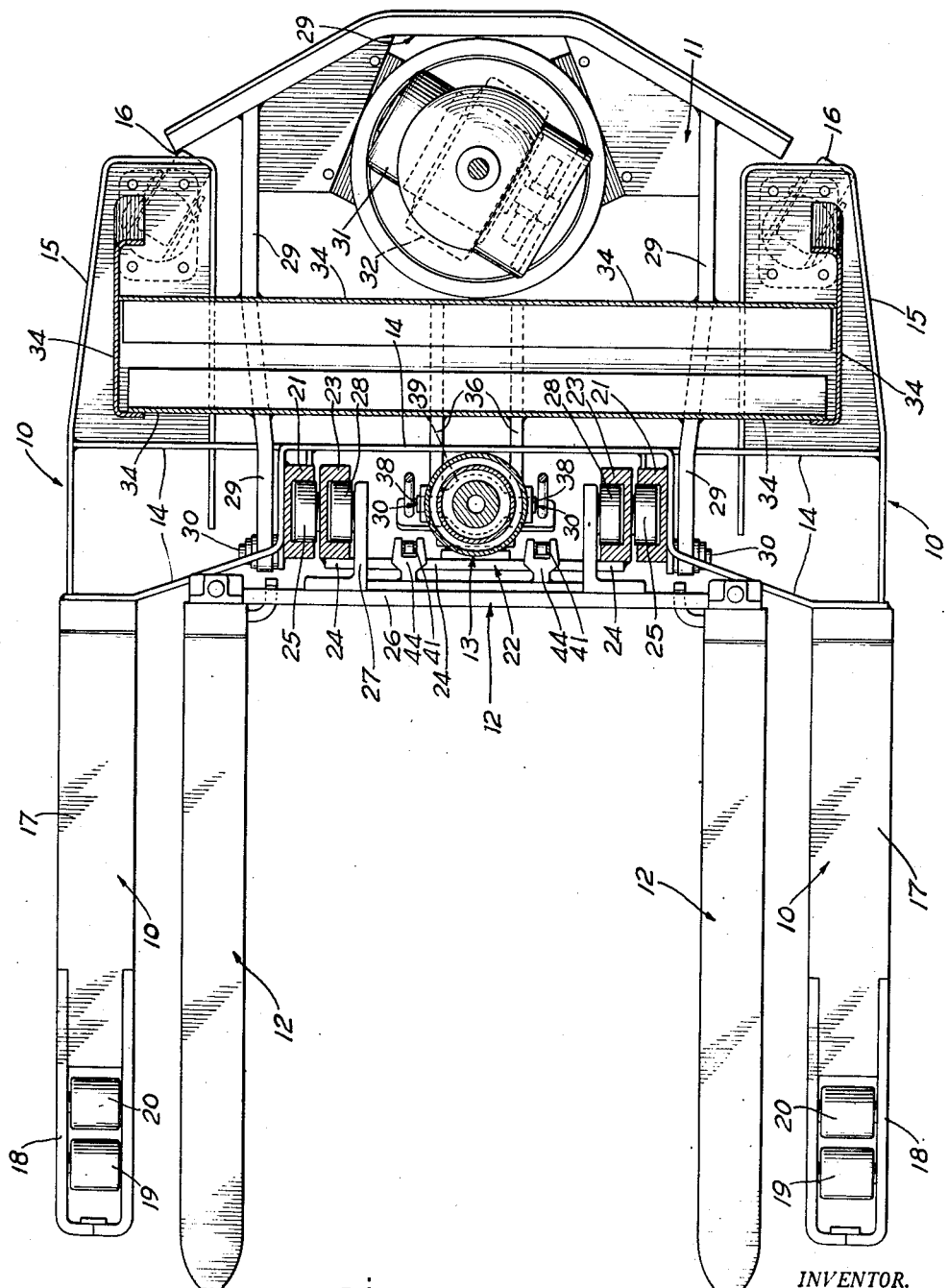

Referring now to the drawings, Fig. 1 is a right side elevational view of a truck embodying the invention. Fig. 2 is a plan sectional view taken generally along lines 2—2 of Fig. 1. Fig. 3 is a vertical sectional view taken along lines 3—3 of Fig. 1, and Fig. 4 is an exploded view of certain basic parts of the truck.

The embodiment illustrated in the drawing and seen as a complete truck in Fig. 1 comprises essentially a main frame provided with four-station wheel support, a tractor or traction unit coupled to said main frame so that the two vehicles are articulated for relative movement in a vertical plane, a load carrying means in the form of a lifting fork assembly mounted on said main frame and adapted for vertical movement relatively thereto, and a lifting mechanism mounted on said tractor or traction unit for raising and lowering said load carrying means.

The truck of this structure has two basic advantages over trucks heretofore known in the art: first, great stability on account of the four-station wheel support of the main frame on which the lifting fork assembly is mounted; and, second, the tractive effort of the truck is automatically varied as needed for driving and braking purposes directly with the weight applied to the load carrying means.

The main elements of the truck are shown separately in the exploded view (Fig. 4) wherein the main frame to the left, and the tractor or traction unit to the right, are respectively designated 10 and 11. The load carrying means of the present embodiment is a lifting fork assembly 12, while the lifting mechanism is here a hydraulic ram 13.

The main frame 10 is fabricated of suitable steel structural members and is roughly of H-shape, having a transverse bridge 14 best seen in Fig. 2. That portion of each longitudinal part of the main frame forward of the bridge 14 is designated 15, and at the forward end of each such longitudinal part is mounted a caster 16. That portion of each longitudinal part of the main frame rearward of the bridge is designated 17, and each is provided with a yoke 18 within which are mounted two supporting wheels 19 and 20.

Thus, it is seen that the main frame 10 is provided with a four-station wheel support, the two forward wheels being capable of swivelling so that the vehicle may be readily turned. The H-shape of the main frame makes possible the nearly rectangular arrangement of widely separated supporting wheels, giving the vehicle a much greater stability, particularly during work involving a high lift, than that available with a tricycle-type wheel support.

As can be seen in Fig. 2, the space between the forward portions 15 of the main frame is conveniently occupied by the tractor or traction unit 11, while that between the rearward portions 17 is made available for the forks of the lifting assembly. Of course, the main frame 10 may be formed in many other ways, as those skilled in the art will fully appreciate.

In a manner common to the art, two primary uprights 21 are rigidly mounted upon the main frame 10 to provide basic guides for the lifting fork assembly. Arranged for vertical movement on primary uprights 21 is a rigid frame 22 having integral secondary uprights 23 and suitable reinforcing horizontal ties 24, one of which is seen in Fig. 2. Secondary uprights 23 are mounted on the primary uprights 21 through rollers 25 as is usual in this art.

The lifting fork assembly includes cross members 26 (Fig. 2) from which extend brackets 27 provided with the usual rollers 28 whereby the assembly is mounted for vertical movement on the secondary uprights 23. Thus, according to the art, the frame 22 is adapted for vertical movement on primary uprights 21 while the lifting fork itself is adapted for vertical movement on secondary uprights 23 so that a telescoping effect is available for high lifts.

The tractor or traction unit 11 is provided with a U-shaped base frame 29 is shown in Fig. 2. The bow of the frame 29 is to the front of the truck. The rear ends of the frame 29 are pivotally mounted at 30 on the lower part of the bridge 14 of the main frame 10 so that the tractor, as a unit, is capable of pivotal movement relatively to the main frame in a vertical plane. While I prefer the pivotal mounting shown, it will be understood that a sliding linkage or other type of coupling might well be used.

In the embodiment here shown, the tractor or traction unit is incapable of turning horizontally independently of the main frame or dolly, but swivelly mounted in the center of the forepart of the tractor or traction unit is an assembly comprising a motor 31, a drive or traction wheel 32, and a suitable transmission interconnecting the two (not shown), all of that class well known in the art. A steering handle 33 is mounted on said assembly, and on such handle controls for the electrical and hydraulic mechanisms of the truck may be mounted for the convenience of the operator.

In the illustrated structure the truck is electrically driven, although it will be obvious that a gas engine or other power unit may be substituted for the motor 31. A suitable housing 34 having a cover 35 is provided upon the frame 29 of the tractor or traction unit for a battery, and, of course, it will be understood that the frame 29 also carries those usual parts associated with the operation of the hydraulic ram and other parts normally included in a truck of this class. Such parts are not illustrated as they are well known.

In the center of the rear of the tractor or traction unit, and clearly shown in Figs. 2, 3, and 4, is an integral bifurcated cantilever beam 36, each arm of which is notched at 37 to provide a seat for the diametrically disposed stub shafts 38 of a bearing member 39 (shown separately in Fig. 4). Bearing member 39 is centrally bored to receive the lower end of the hydraulic ram 13. Thus, the reaction of a lifting thrust exerted by the ram is accepted by the bearing member 39, the arms of the cantilever 36, and the drive or traction wheel 32.

Because the thrust of the ram is received at notches 37 and between the pivotal couple at 30 and the drive or traction wheel 32, the thrust tends to rotate the entire traction unit downwardly with respect to the main frame, and in accordance with the load of the truck, so that the traction wheel 32 is urged against the traction surface with a corresponding force, thereby automatically varying available tractive effort to suit the load.

The hydraulic ram 13 may impart lifting movement to the lifting fork assembly 12 in any of the several ways known in the art. In the form of truck shown in the drawing, the ram 13 has an outermost moving cylinder carrying oppositely disposed rotatable sprockets 40. Two chains 41 are anchored at 42 on a cross member 43 secured to primary uprights 21 and each chain passes up and over one of said sprockets 40 and downwardly to one of two lugs 44 carried by member 26 of the lifting fork assembly (Figs. 1 and 2). As the sprockets 40 are raised in accordance with telescopic extension of the ram 13, the lugs 44 are raised at a greater rate so that frame 22 is raised relatively to the primary uprights 21 and the lifting fork assembly is concurrently raised relatively to both frame 22 and the primary uprights in the manner well understood in the art.

In addition, the ram 13 will apply direct lifting effort to the secondary uprights whereby extremely high lift may be imparted to the lifting forks as best set forth in the Schroeder co-pending application bearing Ser. No. 65,662, filed December 16, 1948.

For a full appreciation of my present invention, it is merely necessary to comprehend that the reaction of the lifting effort of the ram is accepted by the traction unit for the purpose of varying the tractive effort of said unit in proportion to the weight being lifted. I believe that the nature of my invention and its considerable contribution to the art will now be fully understood by those skilled therein.

I now claim:

1. A truck of the class described, comprising a main frame, an elevating platform mounted on said main frame for lifting movement relatively thereto, a traction unit coupled to said main frame for upward and downward movement relatively to said main frame, lifting means for lifting said platform relatively to said main frame, and means whereby said lifting means in lifting said platform exerts a thrust between said traction unit and said elevating platform in proportion to the weight of said platform.

2. A truck of the class described, comprising a main frame, an elevating platform mounted on said main frame for lifting movement relatively thereto, a traction unit coupled to said main frame for upward and downward movement relatively to said main frame, means for lifting said elevating platform relatively to said main frame, and means whereby the reaction of said lifting means in lifting said platform is accepted by said traction unit.

3. A truck of the class described, comprising a main frame, an elevating platform mounted on said main frame for lifting movement relatively thereto, a traction unit coupled to said main frame for upward and downward movement relatively to said main frame, a hydraulic ram for lifting said elevating platform, and means whereby said ram in lifting said platform exerts a thrust between said traction unit and said elevating platform in proportion to the weight of said platform.

4. A truck of the class described, comprising a main frame, an elevating platform mounted on said main frame for lifting movement relatively thereto, a traction unit coupled to said main frame for upward and downward movement relatively to said main frame, a hydraulic ram for lifting said elevating platform relatively to said main frame, and means whereby the reaction of said hydraulic ram in lifting said platform is accepted by said traction unit.

5. The combination of a truck having a main frame, an elevating platform, a traction unit coupled to said main frame for upward and downward movement relatively to said main frame, lifting means for said platform, and means whereby said lifting means in lifting said platform exerts a thrust between said elevating platform and said traction unit in proportion to the weight of said fork.

6. The combination of a truck, an elevating platform liftably mounted on said truck, a traction unit coupled to said truck for upward and downward movement relatively to said truck, lifting means for said elevating platform, and means whereby the reaction of said lifting means in lifting said platform is accepted by said traction unit.

7. The method of varying the tractive effort of a tractor coupled to a lift truck in proportion to the load carried by an elevating platform on the truck which comprises introducing lifting means between said platform and said tractor, applying a lifting force to said platform through said lifting means, and applying the reaction of said lifting force in a downward direction to said tractor.

8. A truck of the class described, comprising a main frame, an elevating platform mounted on said main frame for lifting movement relatively to said main frame, a traction unit pivoted to said main frame for movement relatively to said main frame in a vertical plane, and lifting means mounted on said traction unit and exerting a thrust between said traction unit and said elevating platform in proportion to the weight of said platform for lifting said elevating platform relatively to said main frame.

9. A truck of the class described, comprising a main frame, an elevating platform mounted on said main frame for lifting movement relatively to said main frame, a traction unit coupled to said main frame for pivotal movement relatively to said main frame in a vertical plane, and lifting means mounted on said traction unit and exerting a thrust between said traction unit and said elevating platform for lifting said elevating platform relatively to said main frame.

10. A truck of the class described, comprising a main frame provided with a substantially rectangular arrangement of supporting wheels, an elevating platform mounted on said main frame for lifting movement relatively to said main frame, a traction unit coupled to said main frame for pivotal movement relatively thereto in a vertical plane, and lifting means mounted on said traction unit and exerting a thrust between said traction unit and said elevating platform for lifting said elevating platform relatively to said main frame.

11. A truck of the class described, comprising a main frame provided with four-station wheel support, an elevating platform mounted on said main frame for lifting movement relatively to said main frame, a traction unit coupled to said main frame for pivotal movement relatively thereto in a vertical plane, and lifting means mounted on said traction unit and exerting a thrust between said traction unit and said elevating platform for lifting said elevating platform relatively to said main frame.

12. A truck of the class described, comprising a main frame provided with supporting wheels at four stations, two wheels thereof being swivelly mounted on said main frame, an elevating platform mounted on said main frame for lifting movement relatively to said main frame, a traction unit coupled to said main frame between the swivelly mounted wheels thereof for pivotal movement relatively to said main frame in a vertical plane, said traction unit being provided with a swivelly mounted drive wheel, and lifting means mounted on said traction unit and exerting a thrust between said traction unit and said elevating platform for lifting said elevating platform relatively to said main frame.

13. A truck of the class described, comprising a main frame provided with supporting wheels at four stations, two wheels thereof being swivelly mounted on said main frame, an elevating platform mounted on said main frame for lifting movement relatively to said main frame, a traction unit coupled to said main frame between the swivelly mounted wheels thereof for pivotal movement relatively to said main frame in a vertical plane, said traction unit being provided with a swivelly mounted drive wheel, and a hydraulic ram mounted on said traction unit and exerting a thrust between said traction unit and said elevating platform for lifting said elevating platform relatively to said main frame.

14. A truck of the class described, comprising a main frame, an elevating platform mounted on said main frame for lifting movement relatively thereto, a traction unit coupled to said main frame for movement relatively to said main frame in a vertical plane, means for lifting said elevating platform relatively to said main frame, and means whereby the reaction of said lifting means is accepted directly by said traction unit.

15. A truck of the class described, comprising a main frame, an elevating platform mounted on said main frame for lifting movement relatively thereto, a traction unit coupled to said main frame whereby said truck is capable of vertical articulation between said main frame and said traction unit, a hydraulic ram for lifting said elevating platform relatively to said main frame, and means whereby the reaction of said ram is accepted by said traction unit.

GEORGE F. QUAYLE.

References Cited in the file of this patent

UNITED STATES PATENTS

| Number | Name | Date |
|---|---|---|
| 2,395,345 | Schreck | Feb. 19, 1946 |